Patented Dec. 3, 1940

2,223,686

UNITED STATES PATENT OFFICE 2,223,686

DERIVATIVES OF β-(P-HYDROXYPHENYL)-ISOPROPYLAMINE

Gustav Hildebrandt, Mannheim, Germany, assignor to E. Bilhuber Inc., Jersey City, N. J.

No Drawing. Application December 23, 1937, Serial No. 181,462. In Germany December 31, 1936

4 Claims. (Cl. 260—574)

This invention relates to derivatives of β-(p-hydroxyphenyl)-isopropylamine of the general formula

HO—C₆H₄—CH₂—CH—CH₃
            |
          H—N—X

In this formula X designates an alkyl radical containing at least two carbon atoms, for example ethyl, propyl, isopropyl, butyl, isobutyl, isoamyl etc. or a cycloalkyl radical such as cyclohexyl, o-, m- or p-methyl-cyclohexyl, tetrahydronaphthyl, decahydronaphthyl etc.

It has already been proposed to prepare β-(p-methoxyphenyl)-isopropylmethylamine by treating p-methoxybenzylmethylketone with agents which yield formic acid and methylamine. The formyl compound of β-(p-methoxyphenyl)-isopropylmethylamine is obtained thereby and is saponified with dilute mineral acids.

According to another proposal β-(p-hydroxyphenyl)-isopropylmethylamine may be obtained from β-(p-methoxyphenyl)-isopropylmethylamine by eliminating the methoxy group with strong acids. The resulting β-(p-hydroxyphenyl)-isopropylmethylamine is stated according to this known proposal to be physiologically active and to exert actions similar to those of ephedrine.

According to the process of U. S. A. patent application Serial No. 144,548 β-(p-hydroxyphenyl)-isopropylmethylamine is prepared by condensing p-methoxybenzylmethylketone with methylamine and simultaneously or subsequently reducing and eliminating the methoxy group of the resulting base in a manner known per se.

According to this invention it has been found that the favourable therapeutic properties of β-(p-hydroxyphenyl)-isopropylmethylamine are not limited to this substance alone but that substances of the like favourable therapeutic properties may be obtained by condensing p-methoxybenzylmethylketone with amines of the general formula RNH₂, wherein R designates an alkyl radical or a cycloalkyl radical, simultaneously or subsequently reducing the condensation product and eliminating the methoxy group of the resulting base in known manner. In the preparation of the products of this invention of the general formula

HO—C₆H₄—CH₂—CH—CH₃
            |
          H—N—X the amines of the general formula RNH₂ must be so selected that they yield X substituted amines. The condensation is therefore carried out either with alkylamines, for example methyl-, ethyl-, propyl-, isopropyl-, butyl-, isobutyl- or isoamyl-amine or with cycloalkylamines, for example cyclohexyl, o-, m- or p-methylcyclohexylamine, tetrahydronaphthylamine or decahydronaphthylamine or with both kinds of amines and the quantities thereof are so selected that the desired product of the aforesaid general formula is obtained.

The reduction of the condensation products may be carried out in any desired manner, preferably with the use of nascent hydrogen.

The methoxy group of the resulting base is thereafter eliminated by treatment with strong mineral acids.

Example 16.4 gms. of p-methoxybenzylmethylketone, 50 ccs. of ether, 15 ccs. of colloidal platinum solution, 15 ccs. of 10% platinum chloride solution and 15 ccs. of 30% aqueous ethylamine solution are shaken with hydrogen in a pressure bottle at 3 atmospheres excess pressure until completion of the hydrogen absorption. The product is shaken out with ether and the resulting β-(p-methoxyphenyl)-isopropylethylamine is extracted from the ethereal solution with dilute acid. The base is precipitated from the acid solution with alkalies and taken up in ether. The ether residue is refluxed with excess of 48% hydrobromic acid for one hour, evaporated to dryness in vacuo and thereafter dissolved in a small quantity of water. β-(p-hydroxyphenyl)-isopropylethylamine is precipitated from the aqueous solution with ammonia. It forms a readily crystallisable sulphate which decomposes at 310° C.

What I claim is:

1. A β-(p-hydroxyphenyl)-isopropylamine of the formula

HO—⟨ ⟩—CH₂—CH—CH₃
              |
            H—N—X wherein X is a radical selected from the group consisting of lower alyky radicals containing at least two carbon atoms and cycloalkyl radicals.

2. β-(p-hydroxyphenyl)-isopropylethylamine of the formula

HO—⟨ ⟩—CH₂—CH—CH₃
              |
            H—N—C₂H₅

3. β-(p-hydroxyphenyl)-di-isopropylamine of the formula

HO—⟨ ⟩—CH₂—CH—CH₃
              |
            H—N—CH—CH₃
                 |
                CH₃

4. β-(p-hydroxyphenyl)-iso-propylisobutyl-amine of the formula

HO—⟨ ⟩—CH₂—CH—CH₃
              |
            H—N—CH—CH₂—CH₃
                 |
                CH₃

GUSTAV HILDEBRANDT.